3,518,244
WATER-SOLUBLE QUATERNARY AMINE
CONTAINING MONOAZO DYESTUFFS
Eberhard Mundlos, Frankfurt am Main, and Reinhard
Mohr, Johann Ostermeier, Bernhard Spieb, and Kurt
Hohmann, Offenbach am Main, Germany, assignors to
Farbwerke Hoechst Aktiengesellschaft vormals Meister
Lucius & Bruning, Frankfurt am Main, Germany, a corporation of Germany
No Drawing. Filed Apr. 20, 1967, Ser. No. 632,210
Claims priority, application Germany, Apr. 26, 1966,
F 49,010
Int. Cl. C09b 29/06; D06p 1/02
U.S. Cl. 260—149
9 Claims

ABSTRACT OF THE DISCLOSURE

Water-soluble basic monoazo dyestuffs which are suitable for the dyeing or printing of textile fibrous materials consisting of native or regenerative cellulose, polyamides, polyesters, polyacrylonitrile or polyvinylidene cyanide.

---

The present invention relates to new water-soluble basic monoazo dyestuffs and to a process for preparing them. More particularly the present invention relates to new basic monoazo dyestuffs which are free from sulfonic acid groups or carboxylic acid groups and which correspond to the general Formula I

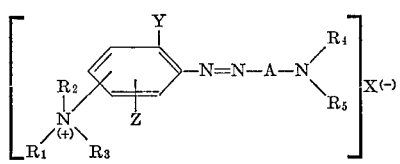

(I)

in which Y represents halogen, a trifluoromethyl, nitro, alkylsulfone, aryl-sulfone, cyano, carboxylic acid ester group, a sulfonic acid amide group, which may be substituted, a carboxylic acid amide group which may be substituted, or an acyl group, Z represents hydrogen or a non hydro-solubilizing substituent, $R_4$ represents hydrogen, an alkyl or aryl radical which may be substituted, a cycloalkyl or an aralkyl radical, $R_5$ represents hydrogen, an alkyl radical which may be substituted, a cycloalkyl or an aralkyl radical, or $R_4$ and $R_5$ together with the N-atom represent a heterocyclic group, A represents a phenylene or naphthylene radical, $R_1$, $R_2$ and $R_3$ represent lower alkyl groups which may be substituted, and $X^{(-)}$ represents an anion, the trialkylammonium group standing in m- or p-position to the azo bridge.

The invention also relates to a process for preparing the above identified basic monoazo dyestuffs of the general Formula I wherein (a) the diazonium compound of a quaternary amine of the general Formula II

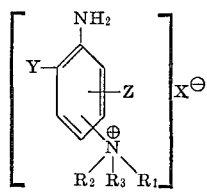

(II)

in which Y, Z, $R_1$, $R_2$, $R_3$ and X have the meaning given above, is coupled with coupling components of the Formula III

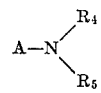

(III)

wherein A, $R_4$ and $R_5$ have the meaning given above, or
(b) an azo dyestuff of the general Formula IV

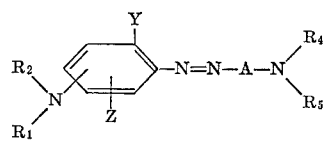

(IV)

wherein Y, Z, $R_1$, $R_2$, $R_4$, $R_5$ and A have the meaning given above, is treated with quaternating agents.

The method (a) is especially suitable and generally applicable. The quaternary amines of the Formula II used in this method can be obtained by treating amines of the Formula V

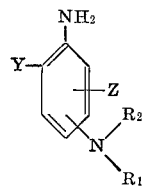

(V)

with alkylating agents or by quaternating nitroamines of the Formula VI

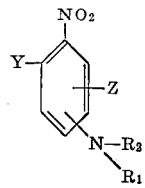

(VI)

and subsequently by reducing the nitro to the amino group according to the usual methods, for example in the presence of catalysts or by means of iron and hydrochloric acid.

As quaternating agents, there may be used alkyl halides, aralkyl halides, halogeno-acetamides, β - halogeno-propionitriles, halogeno - hydrines, alkyl esters of sulfuric acid or alkyl esters of organic sulfonic acids. Suitable quaternating agents are for example methyl chloride, methyl bromide or methyl iodide, ethyl bromide or ethyl iodide, propyl bromide or propyl iodide, benzyl chloride, dimethyl sulfate, diethyl sulfate, benzenesulfonic acid methyl ester, p-toluene-sulfonic acid methyl-, ethyl-, propyl-, or -butyl ester. Quaternization is effected suitably in an inert organic solvent, for example in a hydrocarbon, chlorohydrocarbon or nitro-hydrocarbon, for example benzene, toluene, xylene, tetrachloroethane, chloroform, carbon tetrachloride, mono- or dichlorobenzene or nitrobenzene, in an acid amide or acid anhydride such as dimethylformamide, N-methylacetamide, or acetic acid anhydride, in dimethyl sulfoxide or in a ketone, such as acetone or methylethyl-ketone. Instead of an organic solvent, there may also be used an excess of the quaternating agent. Quaternization is effected at elevated temperature, if desired under pressure. The conditions which are the most favourable in each case can easily be determined in a preliminary test.

Suitable compounds of the Formula V or VI or m- or p-amino- or nitro - N,N, - dialkyl anilines, which carry in o-position to the amino or nitro group, as the substituent Y a halogen atom, a trifluoromethyl, nitro, alkyl sulfone, aryl sulfone, carboxylic acid ester, cyano, carboxylic acid amide group which may be substituted, sulfonic acid amide group which may be substituted, or an acyl group, and which further may be substituted by halogen atoms, alkyl, nitro, alkoxy, alkyl-sulfone, aryl-sulfone, sulfamyl, carbamyl, aryl, aryloxy, acylamino, carbalkoxy, trifluoromethyl, cyano or acyl groups.

Diazotization of the amines of the Formula II is effected according to methods known per se, for example by means of hydrochloric acid and sodium nitrite. The diazonium compounds of the quaternary amines of the Formula II, in which the trialkyl ammonium group stands in p-position to the amino group, may also be obtained by reacting p-chlorobenzene-diazonium-tetrafluoro-borates with trialkylamines in acetonitrile (cf. Houben-Weyl "Methoden der organischen Chemie," vol. X/3, p. 110 (1965)).

Coupling with the coupling components of the Formula III is effected in known manner, for example in a neutral or acid medium, if desired or necessary in the presence of buffer substances or substances which accelerate coupling, such, for example, as pyridine.

As coupling components of the Formula III there may be used according to the invention benzene or naphthalene compounds which are coupling in o- or p-position to a primary, secondary or tertiary amino group. Suitable primary amines are, for example, aniline, toluidine, xylidine, anisidine, phenylene diamines, toluylene diamines, amino cresol ether, alkoxy anilines, chloroanilines, 3-acylamino anilines, dialkoxy anilines or naphthyl amines. As secondary or tertiary amines there may be used compounds which contain as substituents, in the amino group lower alkyl radicals, such as methyl, ethyl, propyl or butyl radicals, aralkyl, cycloalkyl or aryl radicals which may contain further substituents such as halogen atoms, hydroxy, cyano, carboxylic acid ester, carboxylic acid amide, phenyl, alkoxy, phenoxy or dialkylamino groups. In the tertiary amines, $R_4$ and $R_5$ may form one with each other or with a further nitrogen atom or an oxygen atom, hydrogenated heterocycles, such as the piperidine, morpholine or piperazine rings. The benzene or naphthalene radical A may contain other substituents such as halogen atoms, alkyl, alkoxy, carbalkoxy, carboxylic acid amide groups, which may be substituted or sulfonic acid amide, alkylsulfonylamino, trifluoromethyl, hydroxy, acyl, dialkylaminoalkoxy, carbamyl alkoxy, carboalkoxy alkoxy, alkyl-sulfone, cyano or acylamino groups.

The monoazo dyestuffs of the Formula IV used in the method (b) can be prepared by methods known per se, for example by coupling the diazotized amines of the Formula V with coupling components of the Formula III or by alkaline condensation of the amines of the Formula V with the corresponding p-nitroso compounds of tertiary amines of the benzene or naphthalene series.

The dyestuffs obtained according to the present invention contain as the anion X preferably the radical of a strong acid, for example that of sulfuric acid or of its semi-esters, of an arylsulfonic acid or of a hydrohalic acid. These anions, introduced according to the process of the present invention can also be replaced by anions of other acids, for example those of phosphoric acid, acetic acid, oxalic acid, lactic acid or tartaric acid. Furthermore, the dyestuffs can be obtained in form of their double salts with zinc or cadmium halides.

The new dyestuffs are suitable for the dyeing or printing of tanned cellulose fibers, silk, leather or synthetic fibers such as acetate rayon, polyamide fibers or polyester fibers modified by acids, especially fibers containing polyacrylonitrile or polyvinylidene-cyanide. The dyeings produced on these fibers are generally very clear and very intense and generally have a good fastness to light and to wetting. The dyestuffs are largely insensitive to changes of the pH-value of the dye bath and may therefore be used as well in a weakly acid as in a strong acid bath. Furthermore, they are stable at temperatures of above 100° C., such as those used in the dyeing at high temperatures. Wool is completely reserved by these dyestuffs under normal dyeing conditions.

Compared with the monoazo dyestuffs obtained from diazotized m- or p-aminophenyl-trialkylammonium bases and aromatic amines, known from German Pats. 87,257, 87,584 and 1,005,486, the azo dyestuffs of the present invention are largely insensitive to changes of the pH-value of the dyebath; the dyeings on polyacrylonitrile fibers prepared with these dyestuffs are far superior to those made with the aforementioned dyestuffs, especially with regard to fastness to fulling, cross-dyeing, and carbonizing.

The following examples illustrate the invention, but they are not intended to limit it thereto:

EXAMPLE 1

65.3 parts by weight of 4-chloro-3-nitrophenyl trimethylammoninm methyl sulfate were introduced within 20 minutes at 90° to 95° C. into a mixture of 250 parts by volume of water, 40 parts by weight of iron powder and 1 part by weight of glacial acetic acid, stirred for one hour at 95° C., combined with 10.6 parts by weight of calcined sodium carbonate and filtered while hot. 180 parts by volume of 5 N-hydrochloric acid were added to the filtrate, the whole was cooled to 0° C. and thereafter combined within 15 minutes with 40 parts by volume of a 5 N-sodium-nitrite solution, the whole was stirred for 30 minutes, the excess of nitrite was destroyed by amido-sulfonic acid and the diazo solution was clarified with diatomaceous earth and charcoal. 36.7 parts by weight of 3-chloro-N,N-diethyl aniline were introduced into the diazo solution thus obtained, the whole was stirred for 3 hours at room temperature and then combined with 38.6 parts by volume of zinc chloride lye having a strength of 70%. The zinc chloride double salt of the dyestuff cation of the formula

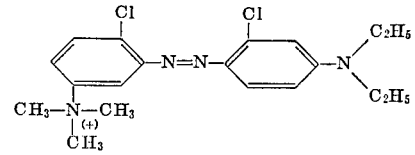

was filtered off with suction, washed with a sodium chloride solution and dried. 87 parts by weight of a dyestuff were obtained which dissolves easily in water and in dilute acetic acid to give an orange solution. 1 gram of the dyestuff was stirred with 2 g. of acetic acid having a strength of 50% and dissolved in 5 liters of water. Then, 100 g. of washed yarn of polyacrylonitrile staple fiber were introduced into the dyebath at a temperature of 60° C., the temperature was increased slowly to 100° and dyeing was effected for 1 hour at the boiling temperature. Then, the whole was allowed to cool gradually to about 70° C., the goods were rinsed and dried. A clear reddish orange dyeing having a very good fastness to light and to wetting was obtained.

When using in the above example instead of 36.7 parts by weight of 3-chloro-N,N-diethylaniline, 35 parts by weight of N-ethyl-N-$\beta$-cyanoethylaniline, the zinc chloride double salt of the cation of the formula

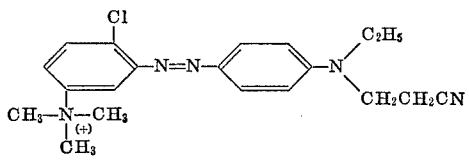

was obtained, which dyes polyacrylonitrile staple fiber orange shades having very good fastness to light and to wetting.

EXAMPLE 2

9.5 parts by weight of 4,5-dichloro-3-nitrophenyl-trimethyl-ammonium methyl sulfate were introduced at a temperature of 90° to 95° C. into a mixture of 50 parts by volume of water, 5 parts by weight of iron powder and 0.3 part by volume of glacial acetic acid, the whole was boiled for 1 hour under reflux, adjusted to a pH-value of 7 by adding 11 parts by volume of a 2 N-sodium carbonate solution and filtered hot. The filtrate was acidified with 22.5 parts by volume of 5 N-hydrochloric acid, cooled to 0° to 5° C. and then combined with 5 parts by volume of a 5 N-sodium nitrite solution. After stirring for 30 minutes, the excess of nitrite was destroyed by the addition of amidosulfonic acid and the diazo solution was clarified with diatomaceous earth. To the diazo solution thus obtained, there were added dropwise, at a temperature of 20° to 25° C., 3.1 parts by weight of N,N-dimethylaniline within 30 minutes, the whole was stirred for 2 hours at room temperature and combined with 5 parts by volume of a zinc chloride lye having a strength of 70%. The zinc chloride double salt of the dyestuff cation of the formula

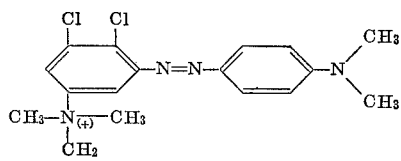

was filtered off with suction, washed with a 10% sodium chloride solution and dried. 8 parts by weight of a yellowish-brown dyestuff which dissolves in water and dilute acetic acid to give an orange solution, were obtained.

5 grams of the dyestuff were stirred with 15 cc. of acetic acid having a strength of 50% and dissolved in 300 cc. of hot water. This stock solution was filled into a dyeing apparatus into which had been previously introduced 6 liters of water and 5 g. of sodium acetate. Then, 500 g. of polyacrylonitrile staple fiber yarn in form of a cross wound bobbin were introduced and dyed under alternating liquor circulation. The temperature was raised very slowly from 85° to about 106° to 108° C. and maintained for 45 minutes. Thereafter, the dyebath was clearly exhausted; it was cooled to about 70° C. and the dyeing was then treated in the usual manner.

A clear gold-yellow dyeing having good fastness to light and to wetting was obtained.

EXAMPLE 3

30 parts by weight of 4-trimethyl ammonio-2,6-dichlorobenzene-diazonium boron fluoride (obtained by the reaction of 2,4,6-trichlorobenzene-diazonium boron fluoride with trimethylamine in acetonitrile) were dissolved in 300 parts by volume of water. The solution was combined with 60 parts by weight of potassium chloride, dissolved in water, the potassium boron fluoride was filtered off with suction and the filtrate was combined with 10 parts by weight of N,N-dimethylaniline while cooling well and stirring. The dyestuff of the formula

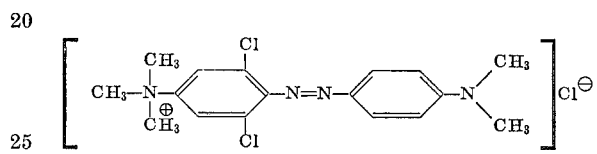

which had separated was filtered off with suction, washed with a small amount of water and dried. 20 grams of the dyestuff were dissolved hot with 50 g. of $\beta,\beta'$-dihydroxydiethyl sulfide, 30 g. of cyclohexanol, 50 g. of a 30% acetic acid and 400 g. of water, and stirred into 450 g. of a crystal gum paste (1:20). This printing colour was used for the printing of a tissue of polyachylonitrile staple fibers. The print obtained was dried, steamed for 30 minutes at 0.7 atmosphere gauge pressure, soaped at 50° C. with an aqueous solution containing, per liter, 1 g. of a condensation product of oleic acid and methyltaurine, and further treated in the usual manner. A well fixed orange print, having a very good fastness to light and to wetting was obtained.

EXAMPLE 4

2 parts by weight of 4-trimethylammonio-2-trifluoromethyl-benzene-diazonium-boron fluoride (obtained by the reaction of 4-chloro-2-trifluoromethylbenzene-diazonium-boron fluoride with trimethylamine in acetonitrile) were dissolved in 10 parts by volume of water and combined, while cooling and stirring, with 1 part by weight of 3-chloro-N,N-diethylaniline. The dyestuff of the formula

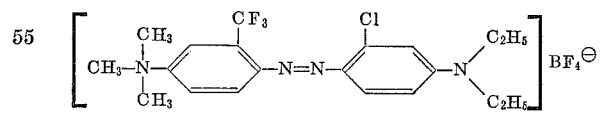

that had formed, was filtered off with suction after one hour, washed with a small amount of water and dried. 3 grams of the dyestuff were dissolved in 10 g. of sulfuric acid of 96% strength and 200 cc. water, then introduced into a winch beck which had been filled with 50 liters of water and 2 g. of the reaction product of 30 mols of ethylene oxide and 1 mol of nonylphenol. 1 kg. of a mixed fabric consisting of 50% of polyacrylonitrile staple fiber and 50% of wool was then dyed; dyeing was started at a temperature of 50° C., the temperature was raised slowly and dyeing was then effected for 1½ hour at the boiling temperature. The whole was allowed to cool slowly to about 70° C. and rinsed. The polyacrylonitrile portion was dyed a reddish orange shade showing good fastness to light and to wetting, whereas the wool portion remained completely reserved.

When using in the above example instead of 2 parts by weight of 4-trimethylammonio-2-trifluoromethylbenzene-diazoniumboron fluoride the corresponding amount of 4-trimethylammonio - 2 - chloro-benzene-diazoniumboron fluoride, the dyestuff of the formula

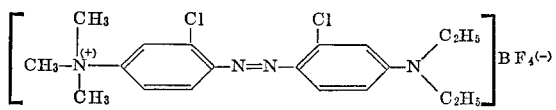

was obtained, which dyes polyacrylonitrile staple fiber orange shades having good fastness to light and to wetting.

When using in the above Example 30 parts by weight of 4-trimethyl-ammonio-2,6-dichlorobenzene - diazoniumboron fluoride and 14 parts by weight of N-ethyl-N-β-cyanoethylaniline and proceeding in the described manner, the dyestuff of the formula

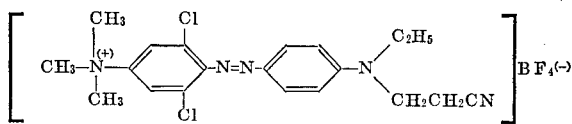

which dyes polyacrylonitrile fibers orange shades having good fastness to light and to wetting was obtained.

EXAMPLE 5

8.2 parts by weight of 4-chloro-3-nitrophenyl-trimethyl-ammonium-methyl sulfate were reduced according to Example 1. Then sodium nitrite was diazotized with sulfuric acid as usual, combined with 4.35 parts by weight of N-ethyl-N-β-cyanoethyl-aniline, stirred for 1 hour at 20° to 5°, combined with 8 parts by weight of sodium sulfate and the dyestuff of the formula

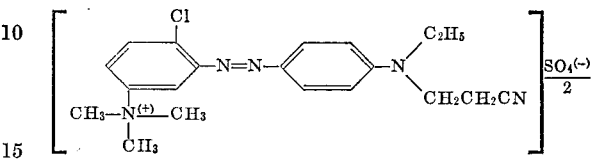

that had separated, was filtered off with suction, washed with a 14% sodium sulfate solution and dried. 9 parts by weight of a dyestuff were obtained, which is easily soluble in water and dilute acetic acid and dyes polyacrylonitrile fibers orange shades being fast to light and to wetting.

The following table indicates other dyestuffs which can be obtained according to the present invention, and the shades of the dyeings produced with them on polyacrylonitrile fibers.

(1) Dyestuffs, the cation of which corresponds to the general formula

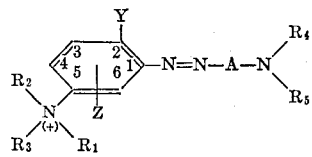

| $R_1$ | $R_2$ | $R_3$ | Y | Z | A—N(R_4)(R_5) | Shade |
|---|---|---|---|---|---|---|
| methyl | methyl | methyl | chlorine | 3-chloro | N,N-diethylaniline | Golden-yellow. |
| methyl | methyl | methyl | chlorine | 3-chloro | 3-chloro-N,N-diethylaniline | Do. |
| methyl | methyl | methyl | chlorine | 3-chloro | 3-chloro-N,N-dimethylaniline | Do. |
| methyl | methyl | methyl | bromide | hydrogen | 3-chloro-N,N-dimethylaniline | Orange. |
| methyl | methyl | methyl | bromide | hydrogen | 3-carbethoxy-N,N-diethylaniline | Do. |
| methyl | methyl | methyl | chlorine | hydrogen | 3-methylaniline | Do. |
| methyl | methyl | methyl | chlorine | hydrogen | N-ethyl-N-p-chlorobenzylaniline | Do. |
| methyl | methyl | methyl | chlorine | hydrogen | 3-carbethoxy-N,N-diethylaniline | Do. |
| methyl | methyl | methyl | chlorine | hydrogen | 3-chloro-N,N-dimethylaniline | Do. |
| methyl | methyl | methyl | chlorine | hydrogen | N-ethyl-N-β-cyanoethylaniline | Do. |
| methyl | methyl | methyl | chlorine | hydrogen | N-ethyl-N-β-dimethylaminoethylaniline | Golden-yellow. |
| methyl | methyl | methyl | chlorine | hydrogen | 1-aminonaphthalene | Scarlet. |
| methyl | methyl | methyl | chlorine | hydrogen | 3-methyl-N,N-dimethylaniline | Orange. |
| methyl | methyl | methyl | chlorine | hydrogen | N,N-diethylaniline | Do. |
| methyl | methyl | methyl | chlorine | hydrogen | N,N-dimethylaniline | Do. |
| ethyl | ethyl | methyl | chlorine | hydrogen | N,N-dimethylaniline | Do. |
| ethyl | ethyl | methyl | chlorine | hydrogen | N,N-diethylaniline | Do. |
| ethyl | ethyl | methyl | chlorine | hydrogen | 3-chloro-N,N-diethylaniline | Do. |
| ethyl | methyl | methyl | chlorine | hydrogen | 3-chloro-N,N-diethylaniline | Do. |
| ethyl | methyl | methyl | chlorine | hydrogen | N,N-diethylaniline | Do. |
| benzyl | methyl | methyl | chlorine | hydrogen | 3-chloro-N,N-diethylaniline | Do. |
| ethyl | ethyl | methyl | chlorine | hydrogen | 3-carbethoxy-N,N-diethylaniline | Do. |
| methyl | methyl | methyl | chlorine | hydrogen | N,N-di-n-butylaniline | Do. |
| methyl | methyl | methyl | chlorine | hydrogen | N,N-dibenzylaniline | Do. |
| methyl | methyl | methyl | chlorine | hydrogen | N-(3-methylphenyl)-morpholine | Do. |
| methyl | methyl | methyl | chlorine | hydrogen | N-(3-chlorophenyl)-morpholine | Do. |
| methyl | methyl | methyl | chlorine | hydrogen | N-phenylpiperidine | Do. |
| methyl | methyl | methyl | chlorine | hydrogen | N-methyl-N-cyclohexylaniline | Do. |
| methyl | methyl | methyl | chlorine | hydrogen | 3-methyl-N-ethylaniline | Do. |
| methyl | methyl | methyl | chlorine | hydrogen | N-methyldiphenylamine | Do. |
| methyl | methyl | methyl | chlorine | hydrogen | 3-chloro-N,N-di-β-hydroxyethylaniline | Do. |
| methyl | methyl | methyl | chlorine | hydrogen | N,N-dimethylaniline-3-carboxylic acid dimethylamide | Brown-yellow. |
| methyl | methyl | methyl | chlorine | hydrogen | 3-bromo-N,N-diethylaniline | Orange. |
| methyl | methyl | methyl | chlorine | hydrogen | N,N-dimethylaniline-3-sulfonic acid dimethylamide | Brown-yellow. |
| methyl | methyl | methyl | chlorine | hydrogen | 3-methylsulfonylamino-N,N-dimethylaniline | Orange. |
| methyl | methyl | methyl | chlorine | hydrogen | 3-ethoxy-N,N-diethylaniline | Brown-yellow. |
| methyl | methyl | methyl | chlorine | hydrogen | 3-carbethoxy-methoxy-N,N-diethylaniline | Orange. |
| methyl | methyl | methyl | chlorine | hydrogen | 3-acetylamino-N,N-dimethylaniline | Brown orange. |
| methyl | methyl | methyl | chlorine | hydrogen | 3-trifluoromethyl-N,N-dimethylaniline | Yellow-orange. |
| methyl | methyl | methyl | chlorine | hydrogen | 3-trifluoroacetylamino-N,N-dimethylaniline | Orange. |
| methyl | methyl | methyl | chlorine | hydrogen | 3-hydroxy-diphenylamine | Brown. |
| methyl | methyl | methyl | chlorine | hydrogen | 3-acetyl-N,N-dimethylaniline | Orange; |
| methyl | methyl | methyl | chlorine | hydrogen | N,N-dimethylaniline-3-sulfonic acid amide | Do. |
| methyl | methyl | methyl | chlorine | hydrogen | N-ethyl-N-β-carbamylethylaniline | Brown-orange. |
| methyl | methyl | methyl | chloride | hydrogen | 3-methyl-N-ethyl-N-carbamylmethylaniline | Do. |
| methyl | methyl | methyl | chlorine | hydrogen | 3-carbamylmethoxy-N,N-diethylaniline | Orange. |
| methyl | methyl | methyl | chlorine | hydrogen | N-ethyl-N-carbethoxy-methylaniline | Yellow-orange. |
| methyl | methyl | methyl | sulfonic acid dimethylamide | hydrogen | 3-chloro-N,N-dimethylaniline | Orange. |
| methyl | methyl | methyl | sulfonic acid dimethylamide | hydrogen | 3-chloro-N,N-dimethylaniline | Do. |
| methyl | methyl | methyl | chlorine | hydrogen | 2-chloro-N,N-dimethylaniline | Golden-yellow. |
| methyl | methyl | methyl | sulfonic acid dimethylamide | hydrogen | 2-chloro-N,N-dimethylaniline | Orange. |
| methyl | methyl | methyl | chlorine | hydrogen | 2-chloro-N-β-cyano-ethylaniline | Yellow. |
| methyl | methyl | methyl | sulfonic acid dimethylamide | hydrogen | 2-chloro-N-β-cyano-ethylaniline | Do. |

(2) Dyestuffs, the cation of which corresponds to the general formula

R₅ stands for lower alkyl and hydrogen, and
A stands for chlorophenylene and phenylene.

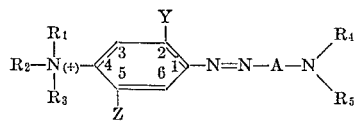

| R₁ | R₂ | R₃ | Y | Z | A—N(R₄)(R₅) | Shade |
|---|---|---|---|---|---|---|
| methyl | methyl | methyl | chlorine | 6-chloro | 3-methyl-N,N-di-β-chloroethyl aniline | Golden-yellow. |
| methyl | methyl | methyl | bromine | hydrogen | N,N-diethylaniline | Orange. |
| methyl | methyl | methyl | bromine | hydrogen | 3-methyl-N,N-diethylaniline | Scarlet. |
| methyl | methyl | methyl | iodine | hydrogen | 3-methyl-N,N-diethylaniline | Do. |
| methyl | methyl | methyl | cyano | hydrogen | 3-methyl-N,N-diethylaniline | Red. |
| methyl | methyl | methyl | chlorine | hydrogen | 3-methyl-N,N-diethylaniline | Scarlet. |
| methyl | methyl | methyl | chlorine | hydrogen | N,N-diethylaniline | Orange. |
| methyl | methyl | methyl | chlorine | hydrogen | 3-chloro-N,N-dimethylaniline | Do. |
| methyl | methyl | methyl | chlorine | 6-chloro | N-ethyl-N-β-dimethyl-aminoethyl-aniline | Golden-yellow. |
| methyl | methyl | methyl | nitro | hydrogen | 3-chloro-N,N-diethylaniline | Red. |
| methyl | methyl | methyl | chlorine | 6-nitro | N,N-dimethylaniline | Golden-yellow. |
| methyl | methyl | methyl | chlorine | 6-nitro | 3-chloro-N,N-diethylaniline | Orange. |
| methyl | methyl | methyl | bromine | 6-bromo | N,N dimethylaniline | Golden-yellow. |
| methyl | methyl | methyl | trifluoromethyl | hydrogen | 3-carbethoxy-N,N-diethylaniline | Orange. |
| methyl | methyl | methyl | trifluoromethyl | hydrogen | N-ethyl-N-β-cyanoethylaniline | Do. |
| methyl | methyl | methyl | chlorine | 6-chloro | N ethyl-N-β-cyanoethylaniline | Golden-yellow. |
| methyl | methyl | methyl | trifluoromethyl | hydrogen | N,N-diethylaniline | Orange. |
| methyl | methyl | methyl | chlorine | 6-chloro | 3-chloro-N,N-diethylaniline | Do. |
| methyl | methyl | methyl | chlorine | 6-chloro | N,N-diethylaniline | Do. |
| methyl | methyl | methyl | trifluoromethyl | hydrogen | N,N-dimethylaniline | Do. |
| methyl | methyl | methyl | chlorine | 5-methyl | 3-chloro-N,N-dimethylaniline | Do. |
| methyl | methyl | methyl | chlorine | 5-methyl | 3-chloro-N,N-diethylaniline | Do. |
| methyl | methyl | methyl | methylsulfone | hydrogen | 3-chloro-N,N-diethylaniline | Do. |
| methyl | methyl | methyl | phenylsulfone | hydrogen | 3-chloro-N,N-diethylaniline | Do. |
| methyl | methyl | methyl | sulfonic acid dimethylamide | hydrogen | 3-chloro-N,N-diethylaniline | Do. |
| methyl | methyl | methyl | carboxylic acid dimethylamide | hydrogen | 3-chloro-N,N-diethylaniline | Do. |
| methyl | methyl | methyl | carboxylic acid ethyl ester | hydrogen | 3-chloro-N,N-diethylaniline | Do. |
| methyl | methyl | methyl | chlorine | 6-chloro | 2,5-biscarbomethoxy-N,N-dimethylaniline | Golden-yellow. |

We claim:
1. The water-soluble basic monoazo dyestuff of the formula

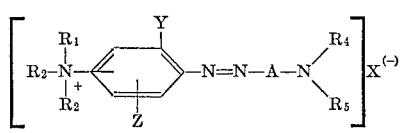

in which Y represents chlorine, bromine, trifluoromethyl, nitro, cyano, lower alkyl sulfonyl, phenylsulfonyl, carbo-lower alkoxy, sulfonic acid amide, N,N-di-lower alkyl sulfonic acid amide, carboxylic acid amide or N,N-di-lower alkyl carboxylic acid amide, Z represents hydrogen, chlorine, bromine, nitro or lower alkyl, $R_1$, $R_2$ and $R_3$ represent methyl or ethyl, $R_4$ represents hydrogen, lower alkyl, cyano lower alkyl, chloro lower alkyl, hydroxy lower alkyl, (di-loweralkyl)amino-lower alkyl, cyclohexyl, phenyl, lower alkyl phenyl, chlorophenyl, benzyl or chlorophenyl-methyl, $R_5$ represents hydrogen, lower alkyl, cyano lower alkyl, chloro lower alkyl, hydroxy lower alkyl, (di-lower alkyl)amino-lower alkyl, cyclohexyl, benzyl or chlorophenyl-methyl, or $R_4$ and $R_5$ represent together with the nitrogen atom morpholyl or piperidyl, A represents phenylene, chlorophenylene, lower alkylphenylene, carb-lower alkoxy phenylene or naphthylene, $X^{(-)}$ represents sulfate, sulfuric acid semiester, arylsulfonate, halogenide, phosphate, acetate, oxalate, lactate, tartrate, fluoroborate, halogenozincate or halogenocadmate, and the trialkyl ammonium group stands in meta- or para- position to the azo group.

2. The dyestuff according to claim 1 wherein $X^{(-)}$ stands for chloride, sulfate, fluoborate or chlorozincate.

3. The dyestuff according to claim 2 wherein
Y stands for chlorine, trifluoromethyl and bromine,
Z stands for hydrogen and chlorine,
$R_4$ stands for lower alkyl and cyano lower alkyl, 4. The water-soluble basic monoazo dyestuff of the formula

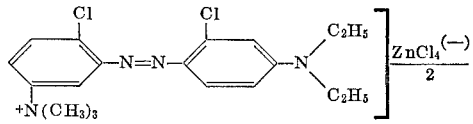

5. The water-soluble basic monoazo dyestuff of the formula

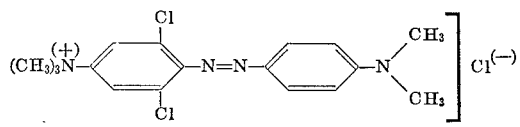

6. The water-soluble basic monoazo dyestuff of the formula

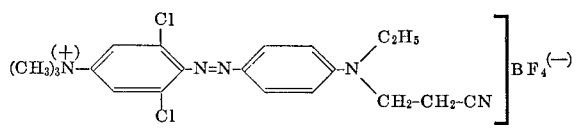

7. The water-soluble basic monoazo dyestuff of the formula

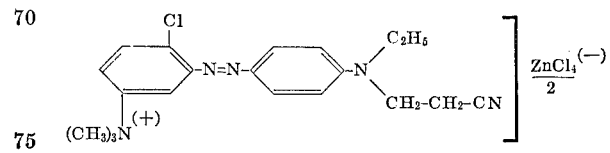

8. The water-soluble basic monoazo dyestuff of the formula
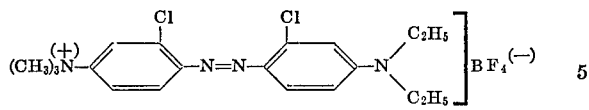
9. The water-soluble basic monoazo dyestuff of the formula
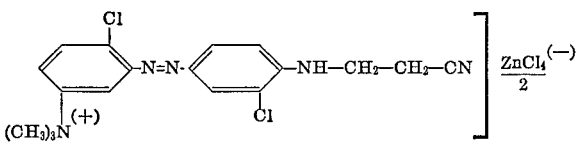
References Cited
UNITED STATES PATENTS
2,821,526 1/1958 Boyd _____ 260—156 X
FOREIGN PATENTS
| 87,257 | 4/1895 | Germany. |
| 87,584 | 6/1865 | Germany. |
| 1,005,486 | 3/1958 | Germany. |
CHARLES B. PARKER, Primary Examiner
D. M. PAPUGA, Assistant Examiner
U.S. Cl. X.R.
8—41, 55; 260—205, 152, 146, 207.1, 206, 196, 151, 207